United States Patent [19]

Harrison

[11] Patent Number: 4,892,472
[45] Date of Patent: Jan. 9, 1990

[54] AUTOMATIC PART-RUNNER SEPARATOR CHUTE

[76] Inventor: James Harrison, 13182 Marshall La., Tustin, Calif. 92680

[21] Appl. No.: 21,132

[22] Filed: Mar. 3, 1987

Related U.S. Application Data

[63] Continuation-in-part of Ser. No. 797,692, Nov. 13, 1985, Pat. No. 4,710,124.

[51] Int. Cl.$^4$ .................... B29C 39/44; B29C 41/52; B29C 41/42; B29C 45/76
[52] U.S. Cl. .................................. 425/139; 425/150; 425/554; 425/556
[58] Field of Search .................. 425/139, 135, 436 R, 425/554, 556, 165, 176, 422, 150

[56] References Cited

U.S. PATENT DOCUMENTS

| | | | |
|---|---|---|---|
| 2,582,891 | 1/1952 | Strauss | 425/556 |
| 3,278,992 | 10/1966 | Strauss | 425/156 |
| 3,669,592 | 6/1972 | Miller | 425/155 |
| 3,776,675 | 12/1973 | Veneria | 425/139 |
| 4,589,840 | 5/1986 | Schad | 425/556 |

FOREIGN PATENT DOCUMENTS 0167233 10/1982 Japan .................................. 425/139

Primary Examiner—Willard Hoag
Attorney, Agent, or Firm—Stetina and Brunda

[57] ABSTRACT

A dispensing system for separating runners and molded products dispensed from an injection mold assembly is disclosed. The dispensing system comprises a dispensing chute disposed proximate the mold assembly. The dispensing chute is operative to direct materials passing into the chute to one of two collection areas in response to control signals. The control signals are generated in synchronization with ejection of the product or the runner such that the product is directed to a first collection area and the runner is directed to a second collection area. The control signal may have a programmable duration such that the dispensing chute may operate in synchronization with various types of sequential ejection systems.

10 Claims, 5 Drawing Sheets

PRIOR ART

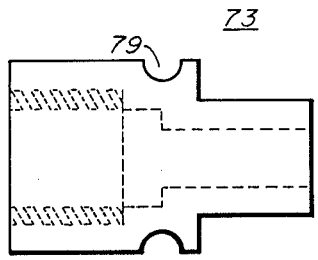
FIG. 5(a)
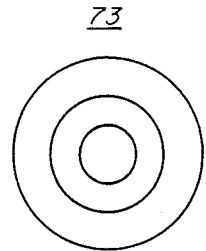
FIG. 5(b)
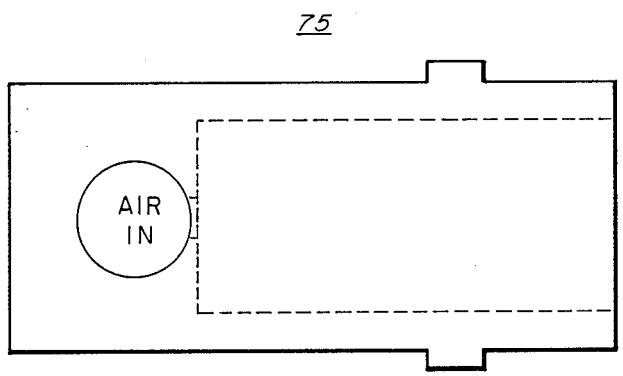
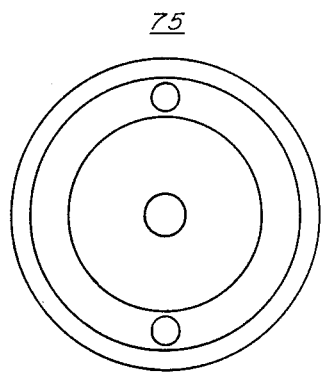

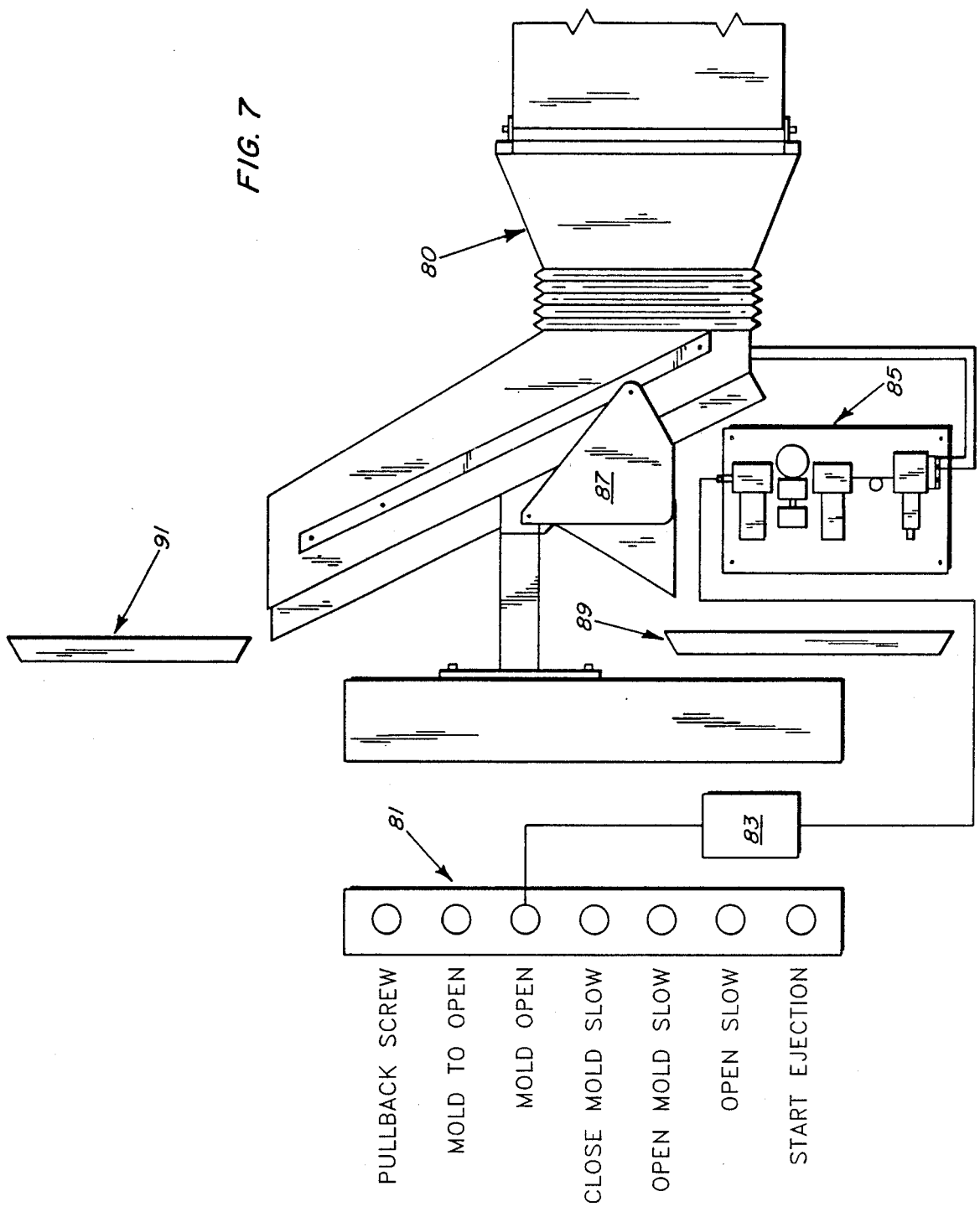

AUTOMATIC PART-RUNNER SEPARATOR CHUTE

BACKGROUND OF THE INVENTION

This application is a continuation in part of application Ser. No. 797,692, filed Nov. 13, 1985, for Automatic Part and Runner Separator.

The present invention relates to plastic injection molds and, more particularly, to devices for separating the molded product from the mold feedline, or runner.

Various types of plastic injection molds are utilized in the industry. In general, the injection molding process includes preheating, plasticizing, and shaping of the molded product within the same tool machine. In the typical injection molding process, granules of a thermal plastic material, having high fluidity, are introduced through a hopper into a cylinder, in which they are heated, e.g., by means of a heating jacket, to above their softening point. The moving piston then plasticizes the material and forces it through a nozzle into the mold.

The molding machine typically comprises separable mold portions or platens, one being stationary, and the other being moveable. The plastic material typically enters the mold through a sprue and runner system, and then flows along the interface of the stationary and moveable mold portions. As the moveable portion of the mold retracts the molded product and the plastic feedline, known as a runner, remain attached to the surface of the moveable mold portion and retract with the moveable mold portion, thus separating the runner and molded product from the feedline to the mold port. Reciprocating ejector pins mounted in the moveable mold portion then advance toward the mold surface to separate mold product and the runner from the mold surface. Upon separation from the mold surface, the runner and molded product fall into a catch basin.

For some mold products, such as parts for model airplanes, and the like, the mold runner may remain attached to the part. However, for many mold products, it is not acceptable for the product to remain connected to the runner, or even for there to be any surface distortions resulting from the separation of the product and the runner.

Separation of the product and the runner may be effected by the utilization of certain techniques for gating the plastic into the mold. In general, a mold gate serves as a door between the runner and the part, and acts as a control valve in filling out the part. Customers for high quality, expensive plastic parts typically require that runner and gate remnants be kept within close specifications or the plastic parts will be rejected.

The most common type of gating is known as edge gating wherein the runner connects to the part normal to an end edge portion of the part. Edge gating typically results in surface distortions, requiring an operator to manually trim those distortions from the part. Other gating techniques, such as submarine gating, differ from edge gating in that the runner connects to the part away from the end of the part. Such alternative gating techniques permit the part to be automatically separated from the runner and trimmed upon separation of the mold. Hot tipped manifold gating is another technique which automatically separates a part from the runner.

Even though techniques such as submarine gating will permit the part and runner to be clearly separated upon separation of the mold, both the part and runner remain attached to the surface of the moveable mold portion until the ejector pins axially reciprocate within the moveable mold portion, causing both the part and runner to be discharged from the face of the moveable mold portion into the catch basin. Contemporary systems typically eject the part and runner at the same time onto a common catch basin or a common conveyer system. The conveyer system then carries the runner and molded parts to operators who then sort the parts and runners by hand, or operate a parts/runner separator device operatively connected to the conveyer system.

The employment of operators to manually sort runners from parts, or the utilization of various automatic sorting systems, add substantial costs to the price of producing the plastic product. Moreover, neither the manual system nor the automatic system for sorting are without error, and both may be difficult to implement with particular molds or applications. Further problems in sorting runners from parts may arise from the need to prevent contamination of plastic parts used, for example, in medical applications.

The present invention provides an apparatus and technique for sorting molded products from the mold runners within the mold itself. The invention may be incorporated into new molds, using standard mold base components, or it can be added to existing molds. The invention avoids the need for parts to be separated on parts/runners conveyer systems, therefore reducing labor costs and avoiding any need for complicated, expensive robotics, or other sorting machinery.

The present invention also provides apparatus and technique for separate discharge of molded products and mold runners by means of a mold runner separator chute operative to divert molded products and molded runners separate collection areas. The chute is operative to divert the molded products or runners in response to control signals coincident with the sequential ejection of parts and runners frome mold assembly.

SUMMARY OF THE INVENTION

A dispensing system for separating runners and molded products dispensed from an injection mold assembly is disclosed. The dispensing system comprises a dispensing chute disposed proximate the mold assembly. The dispensing chute is operative to direct materials passing into the chute to one of two collection areas in response to control signals. The control signals are generated in synchronization with ejection of the product or the runner such that the product is directed to a first collection area and the runner is directed to a second collection area. The control signal may have a programmable duration such that the dispensing chute may operate in synchronization with various types of sequential ejection systems.

BRIEF DESCRIPTION OF THE DRAWINGS

FIG. 7 illustrates an exemplary manner of communicating control signals to a dispensing chute to regulate the operation of the dispensing chute.

DETAILED DESCRIPTION OF THE PREFERRED EMBODIMENT

The description set forth below in connection with the appended drawings is intended merely as a description of the presently preferred embodiment of the invention, and is not intended to represent the only form in which the present invention may be utilized. The description sets forth the functions and sequence of events that are affected by the invention in conection with the illustrated embodiment. It is to be understood, however, that the same, or equivalent functions and sequences, may be accomplished by different embodiments that are also intended to be emcompassed within the spirit and scope of the invention.

Figure 1:
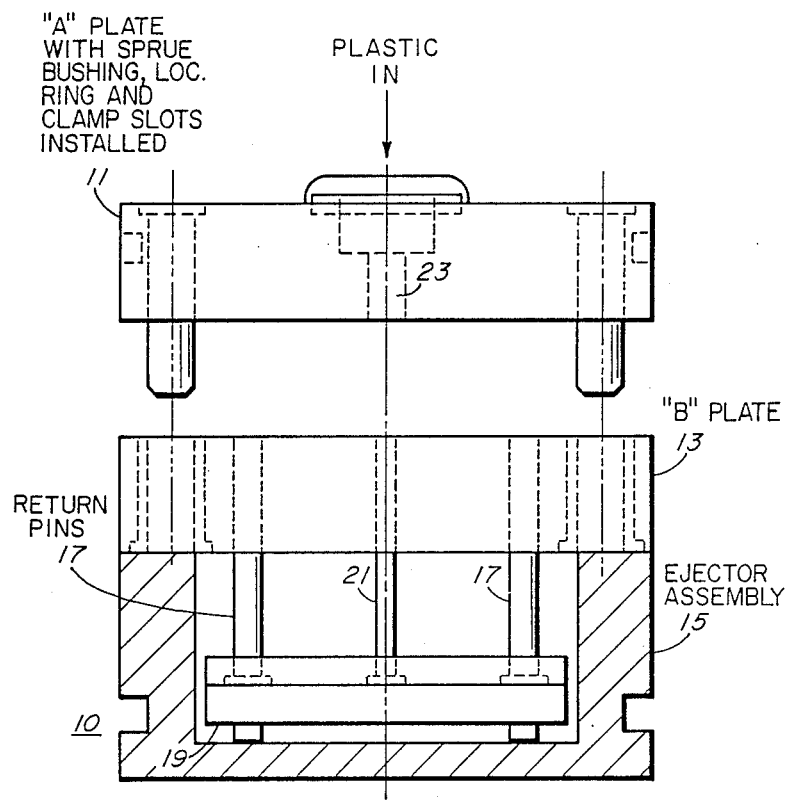
FIG. 1 is a cross-sectional view of a typical mold assembly.

Referring to FIG. 1, a contemporary injection mold assembly, 10 is illustrated therein. Assembly 10 includes platens 11 and 13 adapted for mateable engagement with each other. Platen 13 is secured to ejector assembly 15 and, with ejector assembly 15, collectively form the base of the mold assembly. Return pins 17 facilitate movement of ejector plate 19 within ejector assembly 15. Ejector pin 21 is representative of numerous ejector pins that may be fixedly secured to ejector plate 19, and adapted to extend through or near the upper surface of platen 13 upon reciprocation of ejector plate 19. As shown at FIG. 1, ejector pin 21 is adapted to eject the plastic material entering plate 11 and through sprue 23 from the surface of platen 13 directly above ejector pin 21. The use of additional ejector pins, as well as the mold path to form the plastic product, is illustrated in more detail in connection with FIG. 2.

Figure 2:
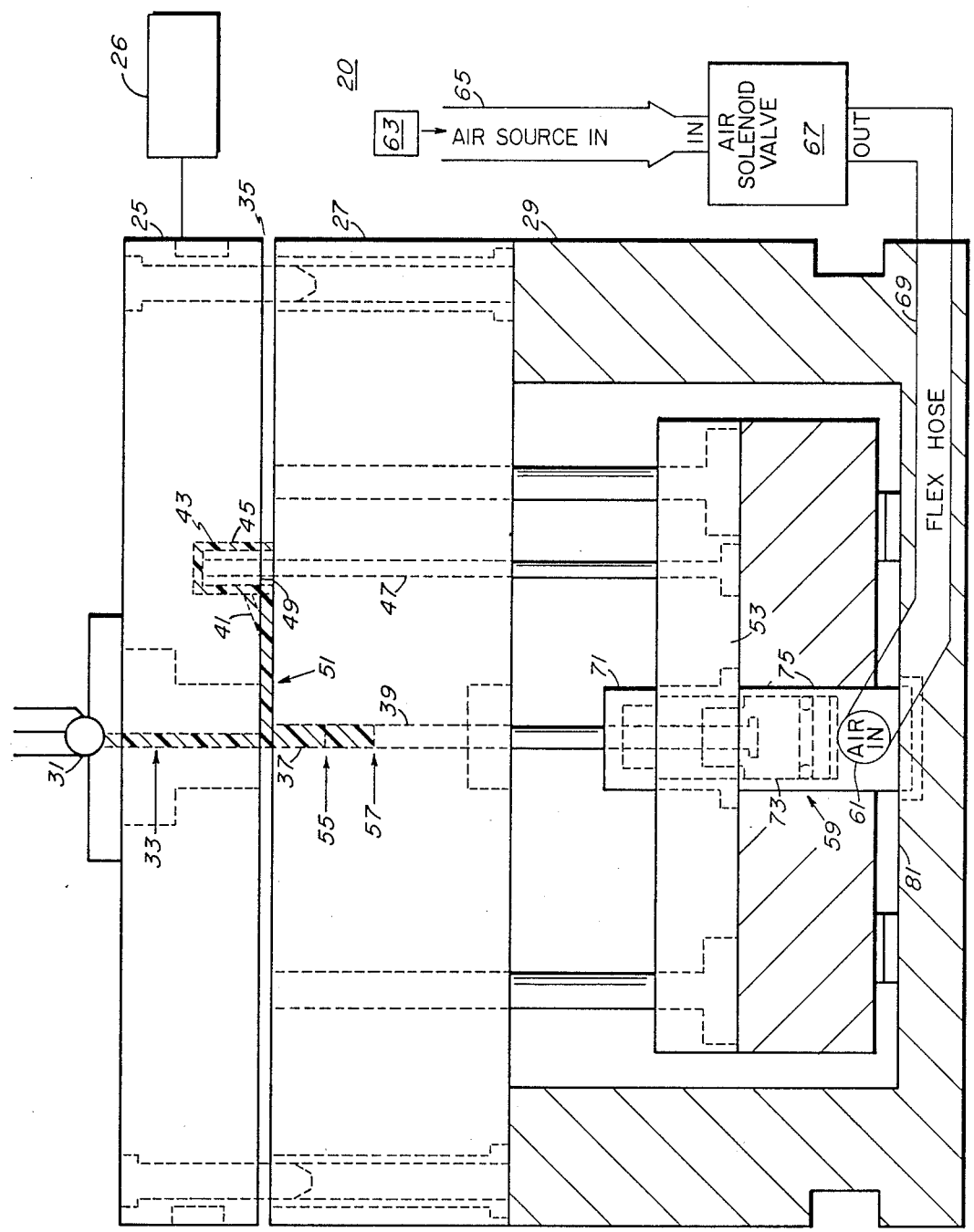
FIG. 2 is a cross-sectional view of a mold assembly incorporating the features of the present invention.

Referring now to FIG. 2, a similar mold assembly is shown therein with the ejector assembly being modified to incorporate the features of the present invention. Mold assembly 20 includes platens 25 and 27, and ejector assembly 29. The mold assembly may incorporate various types of commercially available platens and mold bases such as those produced by D-M-E Corporation, a subsidiary of VSI Corporation of Pasadena, Calif., or Precision Mold Base Corporation of Fullerton, Calif. The mold assembly may be opened by conventional means, such as mold opening means 26, connected to platen 25 and operated in response to mold control signals (e.g. a mold open signal generated by a microprocessor based injection mold system).

Plastic enters mold assembly 20 through port 31 in the upper surface of platen 25. The plastic flows through sprue 33 until it reaches the interface 35 between platens 25 and 27, which defines a runner channel and a cavity shaped to form the desired product. A portion of the plastic flows into cavity 37, beneath sprue 33, which provides a path for reciprocation of ejector pin 39 within platen 27. The plastic also flows along interface 35 through gate 41 into recess or cavity 43 designed to permit the plastic to form the desired shape of product 45.

As indicated above, it should be understood that though gate 41 is illustrated as a submarine gate, it may be formed as other types of gates within the scope of the invention. It is also to be understood that although the single cavity 43 is shown to produce product 45, the mold may include a plurality of cavities designed to facilitate the formation of multiple products during each molding cycle.

FIG. 2 also shows a second ejector pin 47 disposed so as to axially reciprocate within platen 27 and to eject the product 45 from the surface of platen 27.

After the plastic is injected into the mold assembly 20 to form the product 45, platen 27 is moved with respect to platen 25. Typically, platen 25 remains stationary, and platen 27 is retracted, though the opposite may take place. As a consequence of the relative movement between platen 25 and 27, the plastic material is sheered from port 31 and remains attached to the upper surface of platen 27. Such attachment is facilitated by the attachment of the plastic about core 49, which is attached to platen 27 to form the inner definition of cavity 45. The plastic attachment to platen 27 is also facilitated by the flow of plastic into cavities, such as cavity 37, which form a passage for reciprocation of the ejector pins.

Thus, with the use of submarine gating, as shown at gate 41 in FIG. 2, retraction of platen 27 from platen 25 serves to sever the product 45 from runner 51. However, both product 45 and runner 51 remain secured to the upper surface of platen 27, as platen 27 is retracted.

As platen 27 withdraws from platen 25, ejector plate 53 moves toward platen 25, such that ejector pins 39 and 47 would, in contemporaneous devices, normally simultaneously contact the plastic forming the runner 51, and product 45 respectively, causing runner 51 and product 45 to separate from the surface of platen 27 and fall into a catch basin, or conveyer belt, or the like. In order to cause separation of the runner 51 and product 45, the ejector pins must typically travel to the upper surface of platen 27, or the upper surface of port 49 in order to separate the plastic material from the contact surface. The present invention resides in apparatus and a technique for sequencing the impact of the ejector pins against the molded plastic portions, e.g., the runner and molded product so as to sequence the separation of product 45 and runner 51 from the surface of platen 27. Thus, in view of the continued separation of platens 25 and 27, both product 45 and runner 51 will not fall into the same collector, and therefore need not be sorted using conventional sorting techniques.

In accordance with the present invention, ejector pin 47 is caused to separate product 45 from the surface of platen 27 before ejector pin 39 causes runner 51 to separate from the surface of platen 27. Because the platen 27 continues to move with respect to platen 25 after product 45 has been ejected, the runner 51 is ejected at a distance further from platen 25, and therefore may be directed into a separate catch basin or conveyer belt. Though it is anticipated that various apparatus and techniques may be used to separate the product 45 from platen 27 at a different time and/or location as platen 27 continues to separate from platen 25, the description set forth below details one embodiment for effecting such separation.

In modifying many conventional mold assemblies to accommodate the present invention, such modifications would typically include shortening the length of at least one of the ejector pins so that the normal stroke of the ejector pin as a result of movement of the ejector plate will not be sufficient to separate the adjacent plastic portion from the mold, whereas the stroke of the unshortened ejection pin will be sufficient to eject the plastic portion adjacent the unshortened pin. Later, e.g., on a second or later stroke of the ejector plate 53, the shortened pin is caused to extend from the ejector plate 53 a sufficient distance such that the plastic portion adjacent the shortened pin is also forced to separate from the surface of platen 27. Because the platen 27 has moved in between the first and second strokes of ejector assembly 53, the later rejected plastic portion can readily be directed to a separate catch basin or conveyer belt.

In the presently preferred embodiment, ejector pin 39 is shortened such that instead of extending to position 55, when ejector assembly 53 is in its lower position, ejector pin 39 only extends to location 57 at that same time. Consequently, the stroke of ejector assembly 53 is sufficient to cause product 45 to separate from the upper surface of core 49, as a consequence of the translation of ejector pin 47.

In order to cause ejector pin 39 to travel an additional distance beyond the stroke of ejector plate 55, i.e., sufficient to separate runner 51 from platant 27, ejector plate 55 is provided with ejector pin reciprocating apparatus 59. Reciprocating apparatus 59 may be disposed on either side of ejector plate 55. Reciprocating apparatus 59 may be formed as a piston assembly operative to extend ejection pin 35 toward the upper surface of platen 27 on the receipt of pressurized air through port 61. When compressed air is not received through port 61, the ejection pin 39 will not extend beyond the stroke of ejector plate 55, and thus will not push the plastic in cavity 37 sufficiently far to separate the sprue and runner from the surface of platen 27.

The reciprocating apparatus 59 receives compressed air from an external air source 63 through conduit 65, air solenoid valve 67, and flexible hose 69. The air solenoid valve 67 may be any of a variety of air solenoids adapted to gate pressure from pressurized air source 63 in response to control signals indicative of parameters such as the stroke of ejector plate 53 and the separation of the platens 25 and 27. In practice, such control signals may be generated by the molding machinery which controls the injection of plastic into the mold, separation of the platens, and reciprocation of the ejector plate. The control signals may be responsive to the implementation of one or more of those control functions. Such molding machines include injection molding machines manufactured by various companies, including Toshiba of Japan. More detail of the structure and operation of the ejector pin reciprocating apparatus 59 is disclosed in connection with FIGS. 3, 4 and 5.

Figure 3:
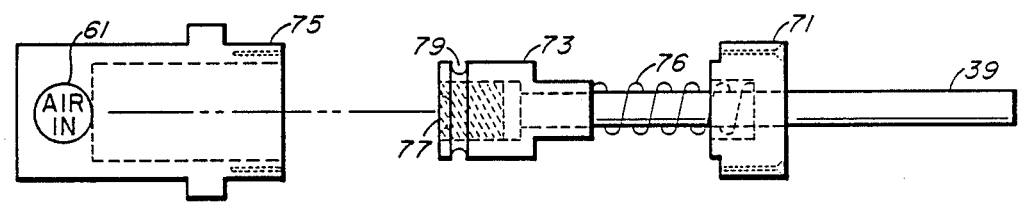
FIG. 3 is an exploded view of an ejector pin reciprocating apparatus in accordance with the present invention.
Figure 4A:
FIGS. 4(a), (b) 5(a), (b) and 6(a), (b) illustrate components of the ejector pin reciprocating apparatus illustrated at FIG. 3.
Figure 4B:
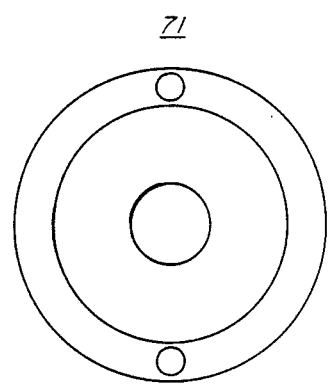

FIG. 3 illustrates the construction of an exemplary ejector pin reciprocating apparatus 59. The reciprocating apparatus 59 includes ejector pin 39, cap 71, piston 73, spring 76 and housing body 75. Ejector pin 39 extends through cap 71 and is secured within piston 73. Set screw 77 may be provided at the opposite end of piston 73, and may be adjusted to vary the extension of pin 39 into the platen 27. Alternatively, pin 39 and piston 73 may be formed as an integral structural member, which may eliminate the need for a separate set screw 77.

Cap 71 may be secured to ejector plate 53, such that spring 76 biases the ejector pin 39 away from the upper surface of platen 27. On the application of air pressure to the surface of piston 73, the pin 39 may be further extended until piston 73 is seated within cap 71.

Housing body 75 is constructed to receive piston 73 and allow piston 73 to axially reciprocate within the body 75. Air inlet 61 is in communication with air solenoid valve 67, such that pressure is applied to move piston 73 at the correct time.

Referring to FIGS. 3, 4, 5 and 6, the construction of the invention may be as follows. The ejector pin 39, or a sprue puller pin, may slide into the piston and be held in place into the piston 73, and be held in place within piston 73 by set screw 77. As previously indicated, the set screw 77 may further be adapted to vary the extension of pin 39. An "0" ring groove 79 may be provided about the piston to separate the pressurized interior of body 75 from the cavity in which ejection pin 39 travels. The surface of an "0"ring fitting within groove 79 and the external surface of the piston may be provided with a light coat of grease or oil to facilitate motion of the piston within body 75. After the piston 73 is placed within body 75, the spring 76 is placed about the ejector pin against the piston. The cap 71 then slides over the ejector pin and is secured to ejector plate 53. The sizing of body 75, piston 73, and cap 71 will of course depend upon the particular mold with which they are used, and the operating characteristics of the individual mold, e.g., size of the ejector body, length of the stroke of the ejector plate, and the length of stroke of the platen 27 from platen 25. If necessary, an aperture may be formed in body 81 to facilitate extension of housing body 75.

In operation, as the mold is opened, part of its separating distance between platens 25 and 27, ejector plate 53 is reciprocated one or more times to discharge part 45 from the surface of platen 27. As the mold continues to open, the ejector plate again reciprocates and air is simultaneously delivered through the solenoid valve 67 to body 75, causing piston 73 to thrust towards the surface of platen 27 in an amount needed to release the runner 51 from the mold. The runner then falls into a sorting area separate from that in which the part 45 has fallen.

As is indicated above, various modifications are anticipated within the scope of the present invention. In one such variation, the pin engaged with reciprocating apparatus 75 may be caused to eject the adjacent plastic portion prior to ejection caused by the non-reciprocating ejection pin, i.e. the pin not connected to reciprocating apparatus 59. Thus, as applied to the embodiment illustrated at FIG. 2, the runner 51 may be caused to separate from the mold prior to separation of product 45.

Additionally, the function of reciprocating apparatus 59 may be affected by the motion of ejector plate 53, where ejector plate 53 cycles through two different length strokes, and the ejector pins are different lengths, i.e., the upper surface of the pins are disposed at different distances from the surface of platen 27. Thus, the first stroke may be sufficient to separate one of the parts, or runner, and the second stroke will cause separation of the remaining one. Such a modification is likely to have more application with new molds, because modification of the stroke of the ejector plate in existing molds may not be commercially feasible.

Referring to FIG. 7 electrical wiring is illustrated which is useful for regulating the operation of the part runner separator and the dispenser mechanism. The output signals illustrated at FIG. 7 are representative of output signals generated by exemplary microprocessor based injection molding systems. Selective use of such control signals may facilitate the operation of the parts runner separator as well as the associated dispenser mechanism, such as a diverter chute. The dispenser mechanism may be any of a variety of commercially available products such as the automatic guide skirt deflection chute manufactured by Molding Automation Concepts of Huntley, Illinois. Such commercially available devices are operative to divert materials discharged from the injection mold assembly into one of two or more collection areas in response to control signals from a microprocessor based injection molding system. Heretofore such chutes have been connected to the molding system to be responsive to alarm signals indicative of defects in the products produced in the mold assembly. Such automatic chute assemblies typically operate in conjunction with cavity pressure controllers, mold or barrel temperature alarms, viscosity index alarms, programmable controllers, or other microprocessor based injection molding system alarm outputs.

The parts runner separator mechanism of the present invention permits conventional deflection chutes to be operated in response to additional control signals so as to affect the novel function of separately directing products and runners into different collection areas. As described below appropriate control signals to separately divert parts and runners into separate collective areas may be derived from contemporary microprocessor based injection molding systems, such that a contemporary deflection chute, when operated in conjunction with the parts runner separator, may accomplish the novel dispensing function that forms a portion of the present invention.

Conventional deflection chute devices, such as the one manufactured by Molding Automation Concepts, operate by regulating a 20-30 psi air pressure and alarm signal in response to control signals communicated to a solenoid valve. Conventional microprocessor based injection molding systems generate two or more ejection signals which are used to pulse the injection mold assembly to discharge the part and runner. As previously noted the present invention may utilize such pulse signals to separately trigger the ejection plate assembly and the extension pin mechanism to provide for separate ejection of the part and runner. Operation of the deflection chute mechanism may similarly be facilitated to one or both of the ejection pulses to vary the direction in which materials discharged from the ejection mold assembly will be sent. Some injection molding systems generate different types of pulses during the ejection signal. Such pulse signals may be discriminated according to well known techniques in order to differentiate pulse signal portions correlating to the time at which the deflection chute will be disposed in each direction.

FIG. 7 illustrates a chute mechanism 80 and exemplary outputs from an output terminal 81 of a microprocessor based injection molding system. The outputs include pullback screw, mold to open, mold open, close mold slow, open mold slow, open slow and start ejection. Operation of the ejector assembly may be performed by initiating the movement of the ejection plate assembly, to discharge the part from the mold, in response to one of the available signals, such as the mold open signal. Operation of the ejection pin mechanism, to discharge the runner, may be commenced in response to the mold close signal. The ejection pin assembly may complete its extension and discharge the runner prior to the time that the mold completes closing.

Operation of the deflection chute 80 may similarly operate in response to any of a variety of signals generated by the microprocessor based injection molding system. In the presently preferred embodiment the mold open signal is communicated to a conventional controlled delay relay 83. The controlled delay relay 83 may be any of a variety of such devices having a variable delay time, such as relays manufactured by G.S. Eagle Signal, Model Nos. 81Q2A604 and H84X15, having a variable delay time between 1/10 of a second and 5 seconds. The relay is operative to pass the mold open signal to the deflection chute control mechanism 85 to permit the deflection door 87 to be displaced. Parts ejected from the ejection mold assembly which the door 87 is displaced are directed to a first collection area 89. The controlled delay relay is preferably operative to return to its original position a variable time period after receipt of the mold open signal. In the presently preferred embodiment the controlled delay relay is operative to return to its original condition approximatley ¼ second after receipt of the mold open signal. As the relay 83 returns to its original position the chute deflection door 87 returns to its original position. Consequently, as the runner is separated from the injection mold assembly it passes through the deflection chute 80 and is directed to a second collection area 91, separate from the parts.

It is anticipated that different control signals from the microprocessor based injection molding system may be utilized to regulate the operation of the deflection chute. Rather than use of a single signal with a delay relay, separate signals may be used as may be available from the particular molding system which is utilized.

Additional modifications and improvements of the invention may also be apparent to those skilled in the art in view of the particular product to be molded, and the structure and operation of the particular mold with which the invention is utilized. Thus, the particular combination of parts described and illustrated herein are intended to represent only one embodiment of the invention, and are not intended to serve as limitations of alternative devices within the spirit and scope of the invention.

What is claimed is:

1. Apparatus for separating runners and molded products ejected from an injection mold assembly, comprising:
   a control circuitry disposed externally of the mold assembly for generating mold control signals to regulate the operation of the mold assembly; and
   a chute mechanism disposed proximate the mold assembly and connected with said control circuitry, the chute and mechanism being operative to separate products and runners by directing products and runners entering the chute to different collection areas in response to the mold control signals from the control circuitry.

2. Apparatus as recited in claim 1, wherein the chute mechanism comprises deflection means, and wherein movement of the mold assembly and the deflection means is regulated in response to the mold control signals.

3. Apparatus as recited in claim 1 wherein the control circuitry includes microprocessor circuitry for controlling the mold assembly.

4. Apparatus as recited in claim 1 wherein the chute mechanism is operable by said control circuit in response to mold control signals for initiating the opening of the mold assembly.

5. Apparatus for separately directing runners and molded products ejected from an injection mold assembly operable to separately eject runners and parts in response to mold control signals generated external to the apparatus and the mold assembly, the apparatus comprising:

a chute mechanism disposed proximate the mold assembly, said chute mechanism being operable to direct materials discharged from said mold assembly to one of two collection areas in response to received chute control signals, said chute control signals being derived from mold control signals and synchronized with the separate ejection of runners and products such that the chute directs the runners to a first collection area and the parts to a second collection area, and circuitry exposed external to the mold assembly and said chute mechanism for generating the mold control signals.

6. The apparatus as recited in claim 5 wherein the chute is disposed in a first position upon the occurrence of a first mold control signal and is movable to a second position upon the passage of a predetermined period of time after occurrence of said first mold control signal.

7. Apparatus for separating runners and molded products ejected from an injection mold assembly operable to separately eject runners and products in response to mold control signals generated external to the device and the mold assembly, the device comprising:

a chute disposed proximate the mold assembly, said chute having a deflector plate mechanism operable to translate to a first position to direct materials passing into said chute to a first collection area in response to at least one of the mold control signals;

control circuitry disposed external the mold assembly and the chute mechanism for generating mold control signals to regulate the operation of the mold assembly; and wherein said deflector plate mechanism is operable to translate to a second position to direct materials passing into said chute to a second collection area after only one of the runner and product has been directed to the first collection area.

8. Apparatus as recited in claim 7 wherein the deflector plate mechanism is operable to translate to said second position after the product has been ejected from the mold assembly.

9. Apparatus as recited in claim 7 wherein the deflector plate mechanism is operable to translate to said second position a variable period of time after said deflector plate mechanism translates to said first position.

10. Apparatus as recited in claim 7 wherein a mold opening means is operable to open the mold assembly in response to one of said control signal.

* * * * *

UNITED STATES PATENT AND TRADEMARK OFFICE
CERTIFICATE OF CORRECTION

PATENT NO. : 4,892,472
DATED : January 9, 1990
INVENTOR(S) : James Harrison

It is certified that error appears in the above—identified patent and that said Letters Patent is hereby corrected as shown below:

Column 5, line 16, delete "platant" and substitute therefore --platen--.

Column 9, line 10, delete "area," and substitute therefore --area;--.

Signed and Sealed this

First Day of January, 1991

Attest:

HARRY F. MANBECK, JR.

*Attesting Officer*     *Commissioner of Patents and Trademarks*